United States Patent [19]

Ackermann et al.

[11] Patent Number: 5,714,828
[45] Date of Patent: Feb. 3, 1998

[54] ELECTRIC MOTOR HAVING A STATOR AND A ROTOR

[75] Inventors: Bernd Ackermann, Aachen, Germany; Jelm Franse, Veldhoven, Netherlands; Ping-Shih Wang, Cheshire, Conn.; Ekkehard Bolte; Anton Hammers, both of Aachen, Germany; Klaus Stips, Würselen, Germany

[73] Assignee: U.S. Philips Corporation, New York, N.Y.

[21] Appl. No.: 396,803

[22] Filed: Mar. 2, 1995

[30] Foreign Application Priority Data

Mar. 4, 1994 [DE] Germany .................. 44 07 164.7
Jun. 10, 1994 [DE] Germany .................. 44 20 371.3

[51] Int. Cl.$^6$ ............................ H02K 5/16; H02K 21/22
[52] U.S. Cl. .................. 310/254; 310/67 R; 310/266; 310/90
[58] Field of Search ................. 310/254, 42, 43, 310/45, 67 R, 90, 51, 266; 384/107

[56] References Cited

U.S. PATENT DOCUMENTS

| | | | |
|---|---|---|---|
| 3,694,907 | 10/1972 | Margrain et al. | 29/598 |
| 3,736,543 | 5/1973 | Lademann et al. | 336/200 |
| 3,769,698 | 11/1973 | Lademann et al. | 29/602 |
| 3,805,104 | 4/1974 | Margrain et al. | 310/266 |
| 4,652,149 | 3/1987 | Nakaoka | 384/100 |
| 4,656,545 | 4/1987 | Kakuta | 360/98 |
| 4,698,542 | 10/1987 | Muller | 310/67 R |
| 4,998,033 | 3/1991 | Hisabe et al. | 310/67 R |
| 5,012,359 | 4/1991 | Kohno et al. | 360/71 |
| 5,012,571 | 5/1991 | Fujita et al. | 29/598 |
| 5,089,732 | 2/1992 | Kohno et al. | 310/67 R |

FOREIGN PATENT DOCUMENTS

| | | | |
|---|---|---|---|
| 0410293 | 1/1991 | European Pat. Off. | H02K 21/22 |
| 0410293B1 | 9/1993 | European Pat. Off. | |
| 3810199 | 10/1988 | Germany | H02K 21/22 |
| 5236717 | 9/1993 | Japan | H02K 29/00 |

*Primary Examiner*—Steven L. Stephan
*Assistant Examiner*—Michael J. Wallace, Jr.
*Attorney, Agent, or Firm*—Edward Blocker

[57] ABSTRACT

An improved spindle motor, particularly for a hard-disc drive, having a stator in the form of a cylindrical coil carried by a mounting plate and a permanent magnet rotor carried on a rotatable hub. At its outer circumference the rotor generates a field perpendicular to the axis of rotation. A bell-shaped portion of the hub surrounds the coil. The hub is supported on the motor shaft by axial and radial hydrodynamic bearings. A soft-iron sleeve-shaped yoke externally surrounds the coil configuration. This permits the coil to be free of soft-magnetic parts, thereby reducing its inductance and improving the dynamic drive characteristics of the motor. The coil is preferably formed by curved foil windings, so there are no winding slots. This avoids the production of detent torques.

10 Claims, 5 Drawing Sheets

ELECTRIC MOTOR HAVING A STATOR AND A ROTOR

BACKGROUND OF THE INVENTION

1. Field of the Invention

The invention relates to an electric motor having a stator comprising a cylindrical coil configuration, which is carried by a mounting plate, and having a rotor, which carries on a rotatable hub a rotor magnet which at its outer circumference generates a field perpendicular to the axis of rotation and which surrounds the coil configuration with a bell-shaped hub portion, the electric motor having bearing means for the hub and having a soft-iron yoke.

2. Description of the Related Art

EP 0,410,293 B1 discloses an electric motor in which a permanent-magnet sleeve is mounted on a central shaft which is fixedly connected to a rotatable hub. The permanent-magnet sleeve is surrounded with a laminated shator arranged on a stationary base. The stator has a winding arranged in slots in the lamination assembly. The hub is radially and axially supported by means of hydrodynamic bearings.

The interaction between the slotted stator and the multi-pole permanent magnet gives rise to so-called detent torques. These are torques which recur periodically with the disc rotation and whose average value is zero, i.e. which do not contribute to the rated torque. The detent torques produce acoustic noise, mechanical vibrations and speed fluctuations and, in addition, they give rise to a higher starting torque, which is a critical parameter particularly for hard disk drives.

Production-dependent eccentricities between the shator of a soft-magnetic material and the permanent-magnet rotor give rise to radial forces. These radial forces also generate acoustic noise and mechanical vibrations. Similar radial forces are produced as a result of unfavourable combinations of the numbers of armature slots and magnet poles. To date the forces caused by eccentricities form the limiting factor for the use of hydrodynamic spiral-groove bearings in small hard disk drives, these forces being often larger than the forces caused by the useful load. In order to withstand these forces the bearings must be substantially stiffer and dissipate more energy than needed to support the useful load. The hydrodynamic bearings themselves cannot be overloaded, since this would have a negative effect as a result of mechanical contact between solid bearing parts, wear and, ultimately, breakdown of the bearings.

The eccentricities in these drives are caused by tolerance limits in the production of individual components and their assembly. The radial forces are therefore subject to production-dependent fluctuations, and significantly increase the variance in the load on the bearings. For reliability therefore, the bearings have to be designed with substantially broader safety margins.

The iron losses in the slotted stator are comparatively high. This problem becomes increasingly significant in the latest developments with a trend towards higher speeds.

The motor inductance is comparatively high because the winding is arranged in slots in the stator iron. This leads to a deterioration of the dynamic characteristics of the motor. For new developments operating with higher speeds this also results in a reduced motor torque.

SUMMARY OF THE INVENTION

It is an object of the invention to provide an electric motor of the type defined in the opening paragraph, in which no detent torques occur, radial forces between stator and rotor as a result of eccentricities are reduced appreciably or eliminated, iron losses are reduced appreciably or eliminated, and the motor inductance is reduced significantly.

According to the invention said object is achieved in that the coil configuration is free from soft-magnet pans and is externally surrounded with a sleeve-shaped soft-iron yoke.

With such a construction no detent torques are produced because the stator no longer has any slots. This results in an appreciable reduction of acoustic noise, mechanical vibrations and speed fluctuations and an increase of the effectively available starting torque.

The inductance has decreased significantly because the coil configuration is now iron-free. This improves the dynamic drive characteristics and remits in an increase of the torque available at high speeds.

In a further embodiment of the invention the soft-iron yoke is fixedly connected to the coil configuration. Such a construction provides a substantial reduction of the radial forces because the width of the magnetically active air gap is now very large. This width is defined by the distance between the permanent magnet and the yoke. The influence of an eccentricity is reduced appreciably because it must be smaller than the mechanical air gap. This means that in any case the eccentricity is distinctly smaller than the magnetically active air gap. As a result of the iron-free coil configuration the magnetic fields are smaller than in a motor with a slotted stator. This reduces the iron losses.

In a further embodiment of the invention the soft-iron yoke is fixedly connected to the hub. With such a construction the radial forces no longer act upon the bearing because the two motor parts between which they act are fixedly connected to one another, so that the forces are taken up by the mechanical construction. The magnet no longer induces any alternating fields in the soft-magnetic yoke, so that no more iron losses occur.

In a further embodiment of the invention the coil configuration comprises curved foil windings. In the case of a flat construction this provides a high copper factor.

It is known to manufacture planar motor windings in that copper tracks provided on synthetic-resin foils are so etched that only flat coil turns are left. Such motor windings allow perfect operation and present no problems as long as the foils are not bent.

Problems do arise, however, when such a winding is shaped into a cylinder. Then the otherwise simple technology leads to short-circuits between the conductor tracks. In addition, such windings cannot be made sufficiently round, as result of which unnecessarily wide air gaps must be created. Non-round coils impair an exact rotation. These problems arise especially in small motors used in hard disk drives.

In a further embodiment of the invention the foil winding, which is built up on a synthetic-resin carrier foil and is formed by the removal of copper material previously deposited continuously onto the synthetic-resin foil, is formed into a substantially evenly rounded cylinder, the planar assembly of the synthetic-resin carrier foil and the planar coils adhering thereto being coated with an adhesive filler material in such a manner that the filler material fills the gaps formed between the individual conductor tracks by the removal of the copper material, and the assembly thus stabilized is wound into an evenly rounded cylinder.

Such a motor winding can be made satisfactorily round. No short-circuits will occur between individual turns.

The uniformly rounded winding enables small air gaps and an exact hub support to be obtained. When such a motor is used in a hard disk drive this allows the packing density of hard disks to be increased.

In a further embodiment of the invention the adhesive filler material filling the gaps has such a stability that it joins the planar conductor tracks of the coils to one another with a dimensional stability as though said gaps were still filled with the removed copper. As a result of this feature an etched foil will behave as a non-etched foil. Since a non-etched foil can be wound into a perfectly round shape this also applies to the foil processed in accordance with the invention.

In a further embodiment of the invention the adhesive filler material is a curable adhesive.

In a further embodiment of the invention the adhesive filler material is applied by silk-screen printing or roller-coating.

In a further embodiment of the invention the bearing means comprise axially acting and radially acting spiral-groove bearings. This minimises the effect of radial forces, which are always present.

BRIEF DESCRIPTION OF THE DRAWINGS

The invention will now be described in more detail with reference to the drawings. In the drawings.

DESCRIPTION OF THE PREFERRED EMBODIMENTS

Figure 1A:
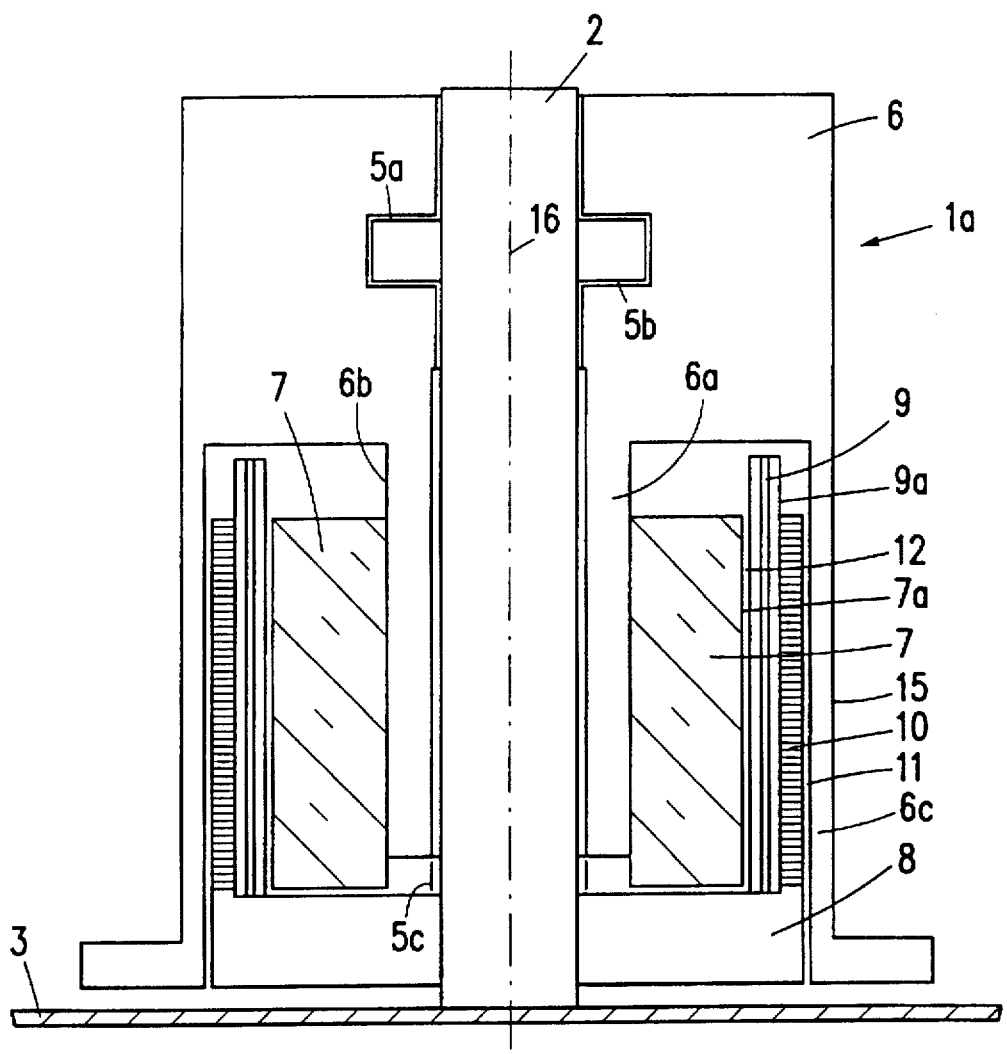
FIG. 1a shows a spindle motor with an ironless coil configuration and a sleeve-shaped soft-magnetic yoke which surrounds the coil configuration and is fixedly connected to the coil configuration.

FIG. 1a is a sectional view of a spindle motor, intended particularly as a drive motor for hard disk drives in data processing equipment. A motor shaft 2 of this spindle motor 1a is fixedly connected to a disk 3 of a hard disk housing, not shown. Two hydrodynamic axial bearings 5a and 5b support a hub 6 on the motor shaft 2 at a location remote from the disk 3. A further hydrodynamic spiral bearing 5c is situated near a mounting plate 8. The hub 6, which is rotatable on the motor shaft 2, has an inner hub portion 6a surrounding the motor shaft 2 and carrying a permanent-magnet rotor 7 on its outer circumference 6b. The field generated by the rotor magnet 7 at its outer circumference 7a extends perpendicularly to the axis of rotation 16. The motor shaft 2 carries the mounting plate 8. This mounting plate carries externally a coil configuration 9, which belongs to the motor and is described below, and a yoke 10, which is also described below. The hub 6 further has an outer bell-shaped hub portion 6c, which surrounds the yoke 10.

The coil configuration 9 comprises a curved foil winding. With the present motor construction the mounting plate 8 carries the sleeve-shaped soft-magnetic yoke 10 at the outer circumference 9a of the coil configuration 9. With the this construction two air gaps 11 and 12 are formed, one air gap 11 separating the yoke 10 from the hub portion 6c and the other air gap 12 separating the rotor magnet 7 from the coil configuration 9.

Figure 1B:
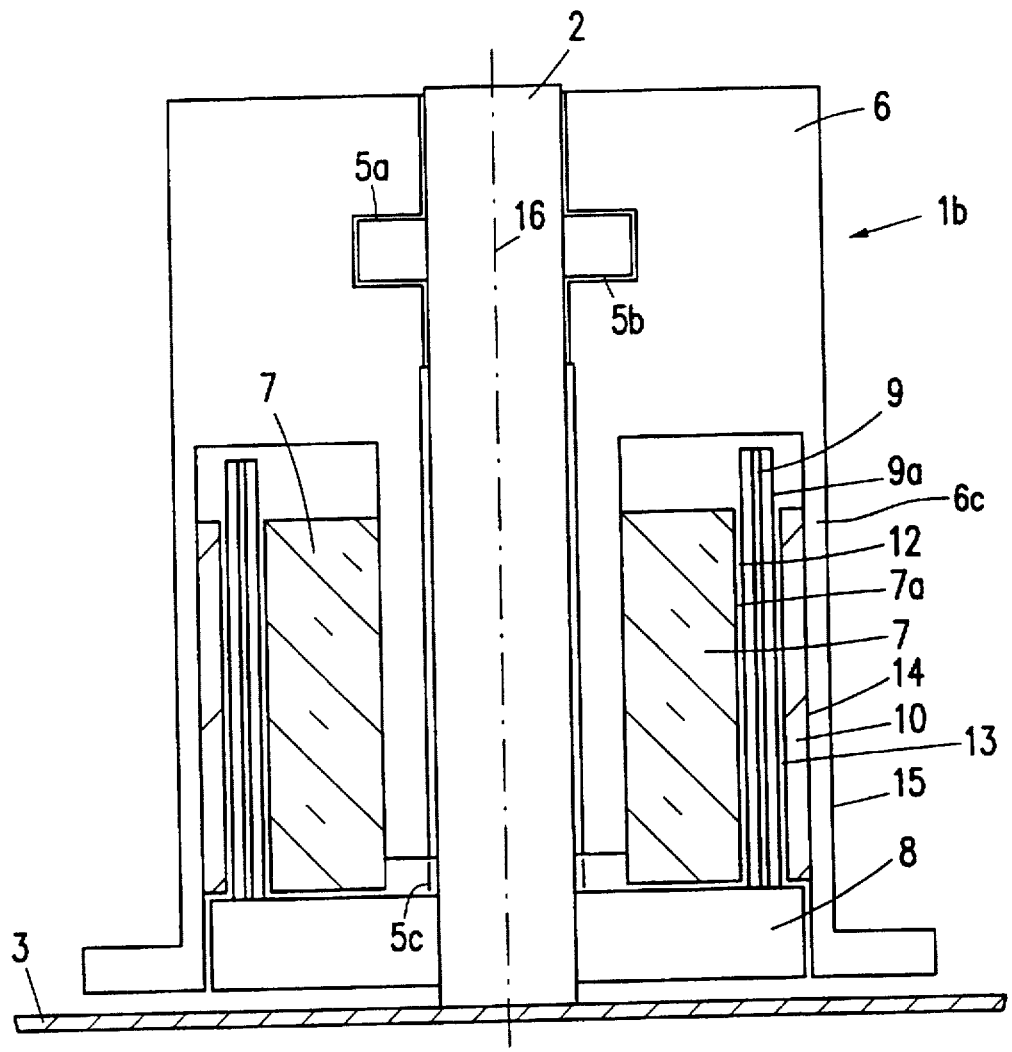
FIG. 1b shows a modification of the spindle motor shown in FIG. 1. in which the yoke is connected to the hub.

FIG. 1b is a sectional view of a spindle motor 1b in another embodiment. The spindle motor shown in FIG. 1b has many pans corresponding to those of the spindle motor shown in FIG. 1a. Corresponding parts bear the same reference symbols. The motor shaft 2 of the spindle motor in FIG. 1b is fixedly connected to the disk 3 of the hard disk housing, not shown. Two hydrodynamic axial bearings 5a and 5b support the hub 6 on the motor shaft 2 at a location remote from the disk 3. A further hydrodynamic spiral bearing 5c is situated near a mounting plate 8. A permanent-magnet rotor 7 is mounted on the hub 6.

The motor shaft 2 carries the mounting plate 8, on which the coil configuration 9 is mounted, which coil configuration comprises a curved foil winding and will be described in more detail hereinafter. The outer circumference 9a of the coil configuration 9 adjoins an air gap 13. At its outside the air gap 13 is bounded by a sleeve-shaped yoke 10 of a soft-magnetic material. This yoke 10 is fixedly mounted on the inner side of the sleeve-shaped hub 6. Again two air gaps are obtained with the present construction, i.e. the air gaps 13 and 12, one air gap 13 separating the yoke 10 from the coil configuration 9 and the other air gap 12 separating the rotor magnet 7 from the coil configuration 9.

The hub 6 can accommodate one or more hard disks on the outer circumference 15 of the outer hub portion 6c.

Figure 2:
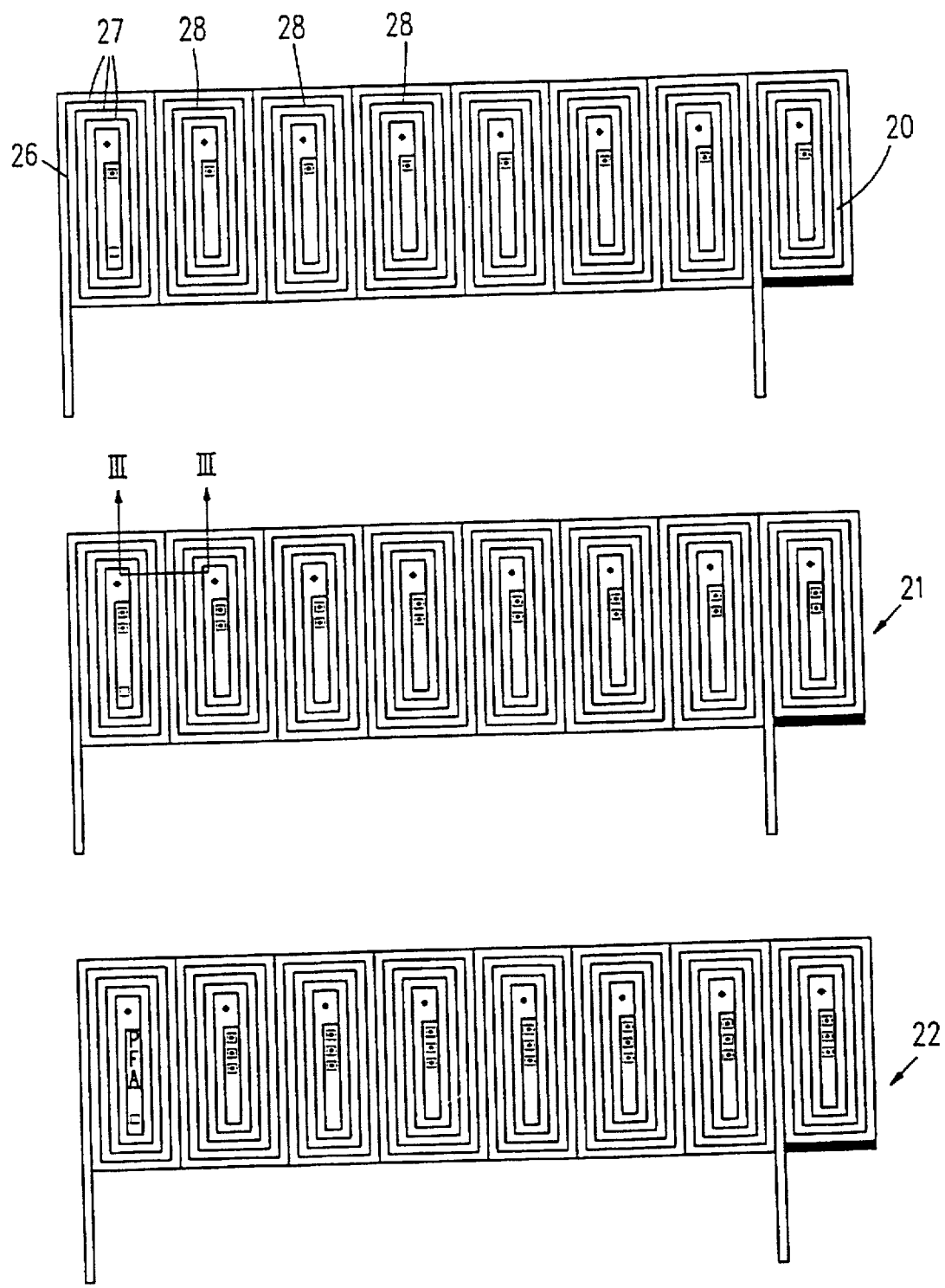
FIG. 2 shows a foil with planar coil windings.
Figure 3:
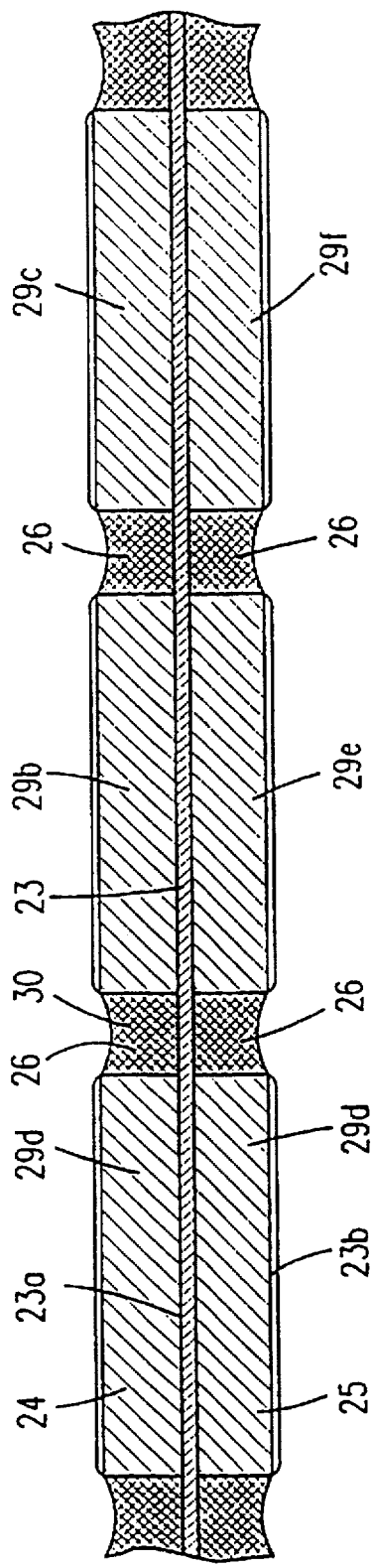
FIG. 3 shows a part of a foil with deposited copper windings in a sectional view taken on the line III—III in FIG. 2.

FIG. 2 shows in plan view three foil windings 20, 21, 22. These three foils are to be rolled so as to form a three-phase winding for the hard disk motor. The rolled state is shown in perspective view in FIG. 4. Each single foil comprises, as FIG. 3 shows, a central synthetic-resin foil 23 provided with copper foils 24 and 25 on its two surfaces 23a and 23b. The copper foils 24 and 25 are etched in a generally known etching process so as to form gaps 26 which separate individual copper conductor tracks from one another, as is visible in FIG. 3. Thus, planar winding coils are formed on the foil 23 at both sides, which coils serve for motor excitation. The coils of the two foil sides are electrically interconnected from the upper to the lower side.

Figure 4:
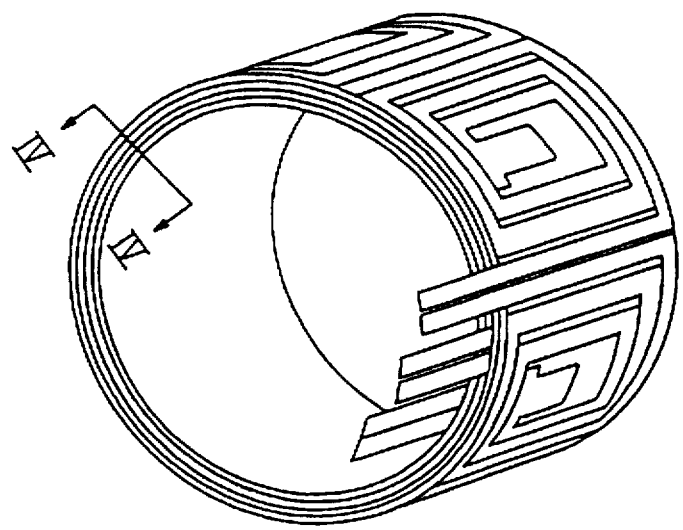
FIG. 4 is a perspective view showing the winding comprising three winding strips of FIG. 2.
Figure 5:
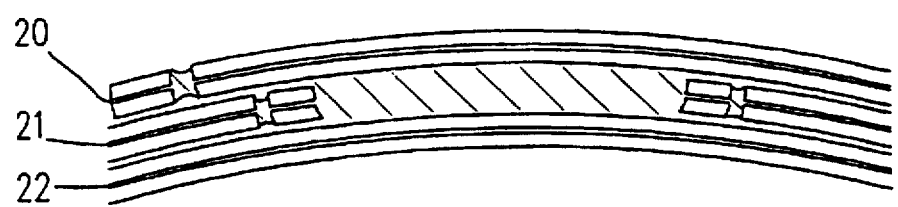
FIG. 5 shows a part of the curved winding to illustrate its absolute roundness.

In a silk-screen printing or roller coating process the gaps 26 are filled with an adhesive filler material. The adhesive filler material is a curable adhesive. The adhesive filler material joins the planar conductor track portions 29a, 29b, 29c, 29d, 29e, 29f to one another in such a stable manner that it interconnects the planar conductor tracks 29 of the coil with a dimensional stability as though the gaps 26 were still filled with the removed copper. Without etching the copper would have adopted a perfectly round shape in the continuous state. This is achieved again by filling the gaps 26 with the adhesive filler. FIG. 4 shows in perspective view how the three foil windings 20, 21, 22 are rolled up into a three-phase winding in a perfectly round shape. FIG. 5 is a sectional view showing the perfect curvatures of the foils 20, 21 and 22 more clearly.

The perfect curvature allows the air gap of the motor to be small. Furthermore, a very good radial support is achieved by the construction of the hydrodynamic spiral groove bearings 5a, 5b and 5c. The perfectly round winding and the use of the spiral groove bearings minimize the radial bearing forces produced by the motor, and hence the deviation of the rotor axis. The result of this is that the motor has a longer life and/or allows wider manufacturing tolerances. Moreover, it enables a higher packing density of the hard disks to be obtained.

To give a general idea of the dimensions, the foil between the copper tracks has a thickness of approximately 20 μm, and the copper foils are dimensioned to have a thickness of approximately 110 μm.

We claim:

1. An improved spindle motor, particularly for a hard-disc drive, comprising:

a closed cylindrical motor shaft which extends along the motor axis and is fixed in position during motor operation;

a cylindrical hub rotatably supported coaxially on said shaft by radial and axial hydrodynamic bearings, the hub having an inner hub portion adjoining said shaft and a bell-shaped outer hub portion spaced from the inner hub portion;

a permanent magnet cylindrical rotor situated in the space between the inner and the outer hub portions and supported on the inner hub portion, said rotor generating a magnetic field in a direction transverse to said shaft;

a cylindrical stator coil assembly which is free of soft magnetic material and is supported between said rotor and the outer hub portion by a mounting plate carried on said shaft, said coil assembly being spaced from said rotor by an air gap; and a sleeve-shaped soft-iron yoke supported by said mounting plate between said coil assembly and said outer hub portion so as to externally surround the coil assembly.

2. An electric motor as claimed in claim 1, wherein the soft-iron yoke is fixedly secured to the coil assembly.

3. An electric motor as claimed in claim 1, wherein the soft-iron yoke is fixedly secured to said hub.

4. An electric motor as claimed in claim 1, wherein the coil assembly is formed by curved foil windings.

5. An electric motor as claimed in claim 4, characterized in that the foil windings are formed on a synthetic resin carrier foil by removal of portions of a film of copper previously deposited continuously thereon, the resulting assembly being stabilized by coating with an adhesive filler material so as to fill gaps between the individual planar conductive tracks formed by removal of portions of the copper film, the stabilized assembly being wound into an evenly rounded cylinder.

6. An electric motor as claimed in claim 5, wherein the adhesive filler material filling the gaps has a stability such that it joins the planar conductor tracks of the coils to one another with a dimensional stability as though said gaps were still filled with the removed copper.

7. An electric motor as claimed in claim 5, wherein the adhesive filler material at the same time forms a layer covering the upper surfaces of the planar conductive track of the coils.

8. An electric motor as claimed in claim 5, wherein the adhesive filler material is a curable adhesive.

9. An electric motor as claimed in claim 5 wherein the adhesive filler material is applied by silk-screen printing or roller-coating.

10. An electric motor as claimed in claim 1, wherein the hydrodynamic bearings are axially acting and radially acting spiral-groove bearings.

* * * * *